United States Patent Office.

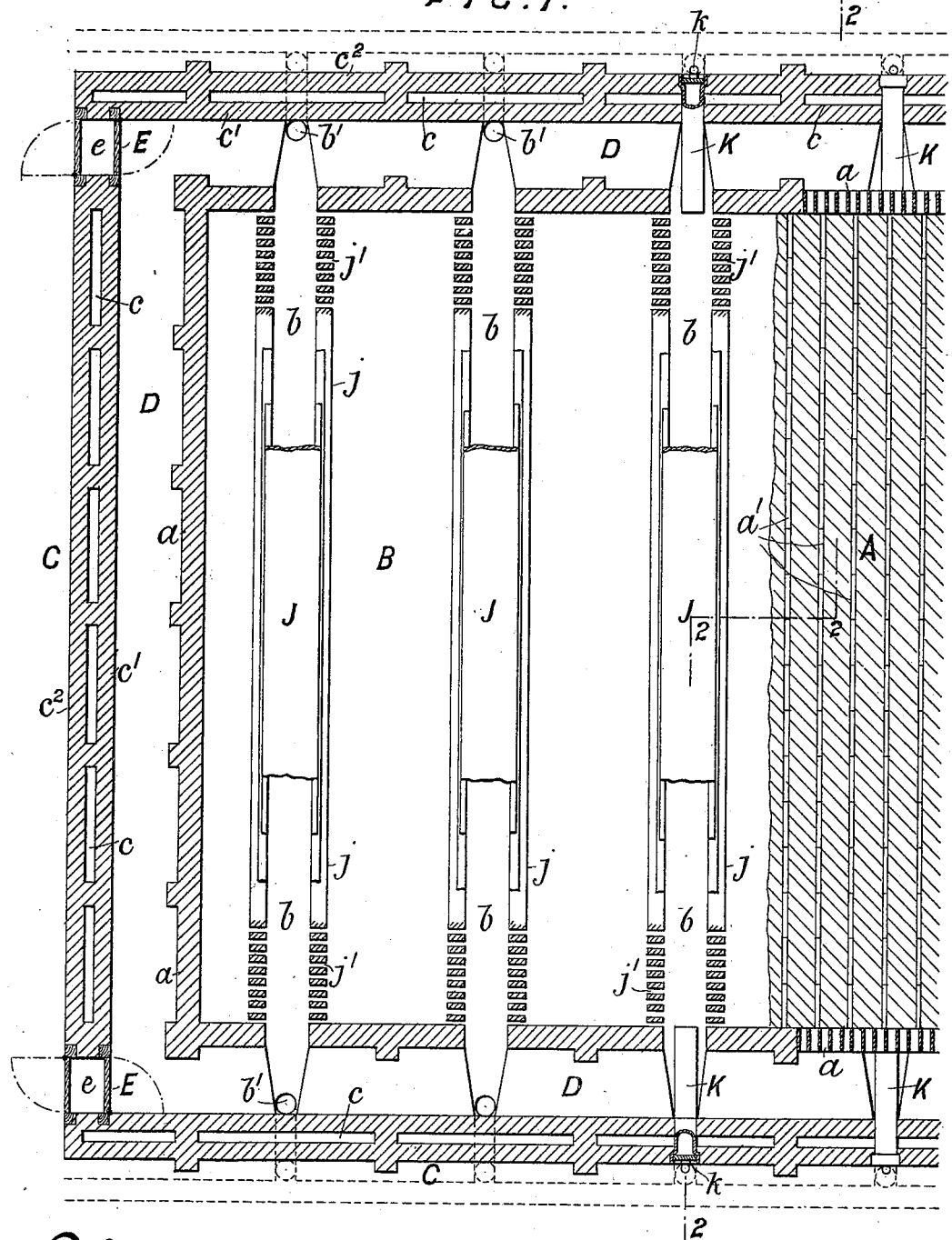

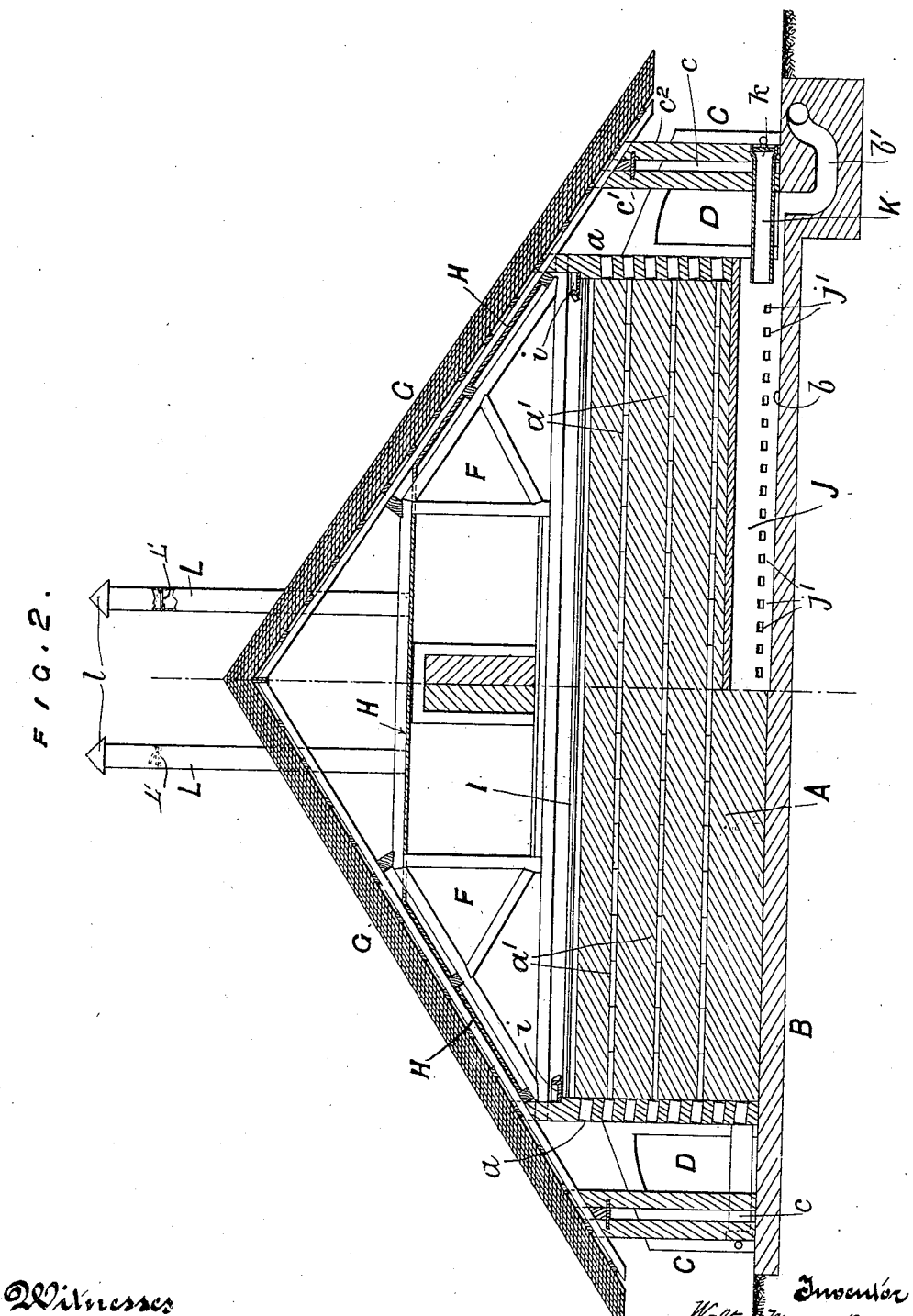

WALTER MARDON DUCAT, OF LONDON, ENGLAND.

FILTER FOR PURIFYING SEWAGE, &c.

SPECIFICATION forming part of Letters Patent No. 651,301, dated June 5, 1900.

Application filed March 16, 1900. Serial No. 8,883. (No model.)

*To all whom it may concern:*

Be it known that I, WALTER MARDON DUCAT, late colonel Royal Engineers, a subject of the Queen of Great Britain, residing at 13 Devonshire Terrace, Hyde Park, London, England, have invented new and useful Improvements in Aerobic Bacterial Filters for the Purification of Sewage and other Foul Waters, of which the following is a specification.

My invention relates to aerobic bacterial filters for purifying sewage and other foul waters, and has for its object to conserve the natural heat of the sewage and that given off in the process of purification, so as to guard against the retardation or suspension of bacterial action in consequence of such heat being radiated into the surrounding atmosphere, particularly in cold weather.

As the amount of heat generated by the decomposition of the sewage considerably exceeds that which would at any reasonable cost for fuel be supplied artificially to the filter, it is obviously very important (especially in dealing with the sewage from a town or other area of any magnitude) to provide means whereby the heat thus given off by the sewage may be conserved and economically applied in the manner best fitted to effect the end in view. Now I have found that the uninterrupted maintenance of a temperature of at least 40° Fahrenheit is essential to such continuous and efficient bacterial action as can alone prevent the blocking of a filter in cold weather with sludge resulting from incomplete and imperfect purification of the sewage, and, further, it has been proved to my satisfaction that it is insufficient for this purpose to maintain heat merely within the interior of the body of the filter-bed. Experience has convinced me that it is equally essential to continuity of action that the surface of the filtering material be maintained at a temperature capable of sustaining the life of those higher organisms which in the upper part of the filter feed on and break down the sewage before the latter reaches the interior of the filter-bed. Owing to these considerations I have found it necessary not only to surround the filter-bed with a wall, so as to protect the sides of the filter from cold and prevent lateral radiation of heat, but, further, to completely inclose the upper surface of the filter-bed (usually left exposed) with a roof which, while adapted to ward off rain, snow, hail, &c., shall also act as an efficient non-conductive covering and so serve under all atmospheric conditions to prevent the temperature of the top of the filter-bed falling so low as to cause interference with the activity of the organisms normally found at or near the upper surface.

To this end my invention consists in inclosing the entire filter at a distance by a roof and walls specially arranged and constructed to insure retention of the natural heat of the filter-bed. The preferred construction comprises a double roof with an intervening stratum of stagnant air, the structure and covering of the roof being of materials which are the worst possible conductors of heat available for the purpose, care being taken that the space between the outer covering of the roof and the inner covering or ceiling is closed as air-tight as possible, so as to keep the air therein stagnant. The framing of the roof is preferably made as light as is consistent with strength and is supported on the filter and the outer inclosing walls, the latter being preferably made double or hollow, with an intervening space for stagnant air and with double doors (with an air-space between) to give access to the space surrounding the filter, the walls and roof being placed at such a distance from the sides and top of the filter-bed, respectively, as to allow of ready access being had to the filter at all points while completely enveloping the filter-bed in a body of warm air. Air-inlets, with regulating dampers or shutters, are provided for the admission of the fresh air required for the due oxidation of the filter, and air-outlet shafts, preferably with non-return valves to prevent back drafts, are arranged to afford the necessary ventilation through the roof, while the effluent channels are so trapped where they pass through the inclosing walls as to prevent access of drafts from the external atmosphere to the space within the walls. Such a construction is illustrated in the accompanying drawings, forming part of this specification, wherein—

Figure 1 is a sectional plan view of part of a filter, the section being taken at more than one level. Fig. 2 is a transverse section on line 2 2, Fig. 1, one air-shaft being partly broken away to show the non-return valve.

The body A of the filter-bed may be constructed as described in the specification of my previous Letters Patent No. 607,426, in which the filtering material forms a nidus for the organisms upon whose vitality and activity the efficient action of the filter depends and is inclosed within perforated walls $a$ and rests upon an impervious foundation or floor B. According to my present invention the filter-bed is surrounded at a distance of, say, three feet from its perforated walls $a$ by double or hollow walls C, of brickwork, concrete, rubble, or other such suitable non-conductive material as may be best available, the space $c$ between the inner and outer thicknesses $c'$ $c^2$ of the walls being closed at top and rendered air-tight by the surface of the walls being tarred, plastered, covered with felt, or otherwise suitably treated. Access is afforded to the space D between the inclosing walls C and the perforated walls $a$ of the filter by means of double doors E, having an air-space $e$ between them, these doors being placed, preferably, at the corners of the end walls, as shown.

The roof consists of trusses F, resting upon the walls $a$ and C and serving to support an outer covering G of ordinary roofing-thatch or other available weather-proof non-conducting material, the latter being, if desired, lined with roofing-felt, and also (if the outer covering be of thatch) with wire-netting or other material impervious to rats and similar vermin. The inner covering H of the roof may consist of a boarded ceiling, as shown, attached to the under side of the rafters, &c., and lined with roofing-felt or other non-conducting material, a secure closure being made between the outer covering G and inner covering H of the roof throughout the whole extent of the eaves and elsewhere where necessary, so as to insure the maintenance of a stratum of stagnant air between the two coverings.

The crude sewage is distributed over the upper surface of the filter-bed by means of a series of troughs I, which extend transversely of the filter and are supplied at both ends from channels $i$. The effluent drains into a series of culverts J, built on the floor B and extending from side to side of the filter-bed, so as to open through the perforated walls $a$, the walls $j$ of these culverts being constructed of perforated bricks or other foraminous material, with drainage-apertures $j'$ in the bottom course, while the bottom $b$ of each culvert constitutes a channel sloping longitudinally from the center toward each end. Each channel $b$ is continued at both ends across the space D and discharges the effluent beyond the outer inclosing walls C through a siphon or trap $b'$, whereby cold drafts from the external atmosphere are prevented from gaining access to the space within the walls C.

During cold weather, when the doors E are kept closed, air is admitted to the filter by means of pipes K, whereof one passes through the double walls C opposite the mouth of each culvert J, the pipe K in each case terminating within the mouth of the corresponding culvert J. A "hit-and-miss" damper $k$ or other convenient form of regulating-valve is provided in each pipe K for the purpose of controlling the supply of air which is delivered from the inner end of the pipe within the culvert J and after passing over the surface of the film of warm effluent flowing in the channel $b$ and so becoming heated passes into the body of the filter-bed through the apertures in the walls $j$ of the culvert.

In warm weather the air, besides gaining entrance to the filter by way of the pipes K, is admitted directly to the space D by way of the doors E and passes into the body of the filter-bed through the perforated walls $a$ and lines of aerating-pipes $a'$, laid horizontally in the body of the filtering material, as described in the specification of my previous Letters Patent above referred to.

Air-outlet shafts L of any suitable construction are arranged to pass through the ceiling H and outer covering G of the roof and terminate in cowls $l$, each air-outlet shaft being provided, preferably, with a non-return valve L' to prevent back drafts.

It is to be observed that, although the construction above described is generally to be preferred, neither the roof nor the walls need be double, provided they are adequate to prevent the radiation of heat from within the space which they inclose.

In conclusion I desire to lay stress on the vital necessity of maintaining under all atmospheric conditions the upper surface of the filter-bed at a temperature sufficient to insure continuance of the action of those higher organisms whose presence and activity in that part of the filter are absolutely essential to the breaking down of the crude sewage before it passes to the body of the filtering medium. Failing such maintenance of the temperature at and near the surface, suspended matter passes into and through the mass of the filter until finally the whole bed becomes clogged with a deposit which is incapable of being further acted on by the organisms, even when the temperature essential to their maintenance in activity is restored. Thus it will be seen that unless the measures which I find necessary are adopted truly continuous filtration under varying atmospheric conditions is unattainable and the necessity of removing, thoroughly washing, and replacing the clogged filtering material or replacing the same by fresh material (which constitutes a considerable item of expense) must be resorted to after practically every occurrence of a fall in the temperature of the external atmosphere below that point at which the life and activity of the organisms which work in the upper part of the filter-bed can be maintained.

I claim—

1. In a filter structure, the combination of an aerobic bacterial filter for purifying sewage and other foul waters having a filter-bed, protective covering-walls placed at a distance from the filter a roof also at a distance from the filter-bed, the roof and walls being of such materials and construction as will prevent loss of heat from within the inclosed space and the consequent lowering of the temperature of the filter-bed to that point at which the vitality of the organisms, upon whose activity the continuous efficiency of the filter depends, becomes suspended.

2. In a filter structure the combination of an aerobic bacterial filter for purifying sewage and other foul waters having double walls with a stagnant-air space or spaces between them and a double roof having a sealed stagnant-air space or spaces between the two parts thereof so as to constitute non-conducting roof and walls for preventing loss of heat from within the structure whereby the temperature of the air on top of the filter will be maintained high enough to prevent the destruction of the organisms operating at or near the top of the filter.

3. In a filter structure, the combination of an aerobic bacterial filter for purifying sewage and other foul waters having a filter-bed, protective covering-walls placed at a distance from the filter a roof also at a distance from the filter-bed, the roof and walls being of such materials and construction as will prevent loss of heat from within the inclosed space and the consequent lowering of the temperature of the filter-bed to that point at which the vitality of the organisms, upon whose activity the continuous efficiency of the filter depends, becomes suspended, and an air-outlet provided with a non-return valve to prevent back drafts.

WALTER MARDON DUCAT.

Witnesses:
M. R. SPIER,
W. P. GRAFTON.